United States Patent

[11] 3,563,618

[72] Inventor Viktor Vasilievich Ivanov
Krasnoprudnaya ulitsa, 26, kv. 26,
Moscow, U.S.S.R.
[21] Appl. No. 849,659
[22] Filed Aug. 13, 1969
[45] Patented Feb. 16, 1971

[54] GAS-OR LIQUID-LUBRICATED HYDROSTATIC DOUBLE-ACTION THRUST
1 Claim, 1 Drawing Fig.

[52] U.S. Cl................................................ 308/9;
103/112
[51] Int. Cl.................................................. F16c 17/16
[50] Field of Search.......................................... 308/9, 160;
103/112

[56] References Cited
FOREIGN PATENTS
223,691 10/1908 Germany

Primary Examiner—M. Cary Nelson
Assistant Examiner—Frank Susko
Attorney—Waters, Roditi, Schwartz & Nissen ABSTRACT: A gas- or liquid-lubricated hydrostatic double-action thrust bearing intended for taking axial loads in machines, for example, in centrifugal pumps. The bearing has a disk-shaped thrust plate with collars located at both sides thereof, the collars being mounted in the stationary body of the machine, which is also provided with passages for supplying power fluid into the face space, which, together with a collar, forms an annular chamber. The annular chamber through annular gaps communicates with a reduced pressure space and with a chamber located at the opposite face of the thrust plate, which, in turn, communicates with the reduced pressure chamber through a gap which is closer to the longitudinal axis of the thrust bearing than the said annular gaps.

PATENTED FEB 16 1971   3,563,618
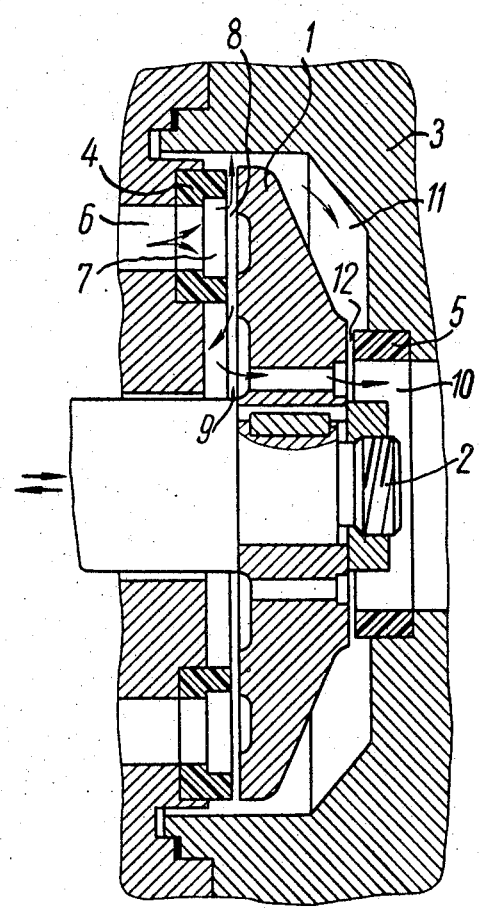

GAS- OR LIQUID-LUBRICATED HYDROSTATIC DOUBLE-ACTION THRUST

The present invention relates to the field of mechanical engineering and more particularly has reference to gas- or liquid-lubricated hydrostatic double-action thrust bearings taking axial forces in machines, for example, in centrifugal pumps.

Known in the art are gas or liquid-lubricated hydrostatic double-action thrust bearings designed for taking axial loads in various machines.

These bearings comprise a disc-shaped thrust plate with collars provided at either side thereof, which collars are mounted within the stationary portion of the machine. This portion is also provided with passages for feeding power medium into chambers which go through gaps communicate with a reduced pressure space.

In the known bearings a flow of power medium directed to the working chambers is throttled at the inlet thereof by radial slots provided between the cylindrical surfaces of the thrust plate and the stationary member of the bearing, in which case the hydraulic resistance of the slots does not depend on the axial position of the rotor, whereas at the outlet of the chambers this flow is throttled by slots formed by the faces of the thrust plate and the stationary member. It should be readily apparent, that the ratio of the slot resistances at the inlet and outlet of the chamber is a characteristic feature of such a bearing. The maximum load capacity of the bearing corresponds to a definite limited range of this quantity. In the process of operation, however, this ratio is changed due to nonuniform wear of the surfaces forming the slots. This results in that the bearing loses its initial load capacity, the consumption of power medium flowing through the bearing is increased and, finally, the load exerted on the shaft starts to exceed the bearing load capacity and this leads to a breakdown of the bearing.

On the other hand, the presence of throttling slots with small gaps formed by cylindrical surfaces complicates the manufacture and assembly of the bearing.

An object of the present invention is to eliminate the above-mentioned disadvantages. Other objects and advantages of the invention will be apparent upon consideration of the following description.

The specific object of the invention is to provide a gas- or liquid-lubricated hydrostatic thrust bearing having an increased load capacity, a lower consumption of power medium, a higher sensitivity to changes of the load, a simple process of manufacture and assembly, a higher reliability and a longer service life as compared with the prior art bearings of the same type and operating under the same conditions.

This object has been attained by providing a double-action gas- or liquid-lubricated hydrostatic thrust bearing for taking axial forces in machines, particularly centrifugal pumps, which bearing is equipped with a disc-shaped thrust plate with collars positioned at the faces thereof within the stationary portion of the machine, having passages for supplying power medium into a chamber communicating through gaps with a reduced pressure space. In the bearing, according to the invention, these passages have outlets into the face space of the thrust plate which, together with the collars, forms an annular chamber communicating through gaps with the reduced pressure space and with a chamber positioned at the opposite face of the thrust plate which, in turn, communicates with the reduced pressure space through a gap located closer to the longitudinal axis of the thrust plate than the above-said gaps.

Further objects and advantages are within the scope of this invention such as relative to the arrangement, operation and function of the related elements of the structure, parts, element per se, and other features will be apparent from a consideration of the description and drawing of a form of the invention, which may be preferred, in which is shown an elevation of the proposed bearing according to the invention.

The double-action gas- or liquid-lubricated thrust bearing has a disc-shaped thrust plate 1 mounted on shaft 2 of the machine, for example, of a hermetically sealed centrifugal pump. Mounted in the pump stationary portion 3 and opposing the faces of the thrust plate 1 are collars 4 and 5. For supplying power medium into the bearing, the stationary portion of the machine is provided with passages 6 which have outlets into the face space of the thrust plate 1. The collar 4 and the thrust plate 1 have annular slots forming an annular chamber 7 communicating through gaps 8 and 9 with a reduced pressure space 10 and with a chamber 11 positioned at the opposite side of the thrust plate 1.

The chamber 11, in its turn, communicates with the reduced pressure space 10 through a gap 12 located closer to the longitudinal axis of the thrust plate 1 than the gaps 8 and 9.

The bearing operates in the following manner.

The power fluid fed from the pressure line of the pump through the passages 6 is admitted into the annular chamber 7, wherefrom the power fluid passes in two directions: through the gap 8 into the chamber 11, then through the gap 12 into the reduced pressure space 10, and through the gap 9 into the same space 10.

If the thrust plate is displaced to the left under the action of the axial forces exerted on the pump shaft, the gaps 8 and 9 decreased, while the gap 12 increases, and the pressure in the chamber 11 reduces, tending to be equal to the output pressure of the reduced pressure space 10 when the gap 8 is zero. In this case, the pressure differential in the chambers 7 and 11 acts upon the annular area of the thrust plate 1 within the chambers 7 and 11 thus balancing the axial force.

If the thrust plate is displaced to the right, the gaps 8 and 9 increase while the gap 12 decreases, and the pressure in the chamber 11 tends to be equal to that in the annular chamber 7 when the gap 12 is zero. In this case, the pressure differential in the chambers 7 and 11 acts upon the area of the thrust plate, limited by the diameters within which the gaps 9 and 12 are situated, and balances the axial force.

In other embodiments of the bearing the annular chamber can be formed either by an annular groove on the thrust plate itself and by the collar or by an annular groove on the collar and by the thrust plate as well as by two collars and the thrust plate.

The industrial tests of the vertical centrifugal pumps equipped with the bearings of the above-described construction have shown that this bearing features a long service life and is highly reliable in operation, features an insignificant consumption of power medium and also is simple in mounting and adjustment.

The above bearings may be used in various branches of mechanical engineering in which bearings are required to take axial loads, yet the most effective application of such a bearing will be in chemical engineering where it can be used in hermetically sealed chemical process machines and apparatus in which common use sliding or rolling thrust bearings cannot be used as supporting elements.

While the form of the assembly herein described constitutes a preferred embodiment, it is to be understood by those skilled in the art that the invention is not limited to this precise form of the assembly, and that changes and modifications may be made therein without departing from the spirit and scope of the invention as defined in the appended claim.

I claim:

1. A gas- or liquid-lubricated hydrostatic double-action thrust bearing for taking axial forces in machines, preferably in centrifugal pumps, comprising a shaft of the machine, a disc-shaped thrust plate mounted on said shaft, collars positioned at the faces of said thrust plate and arranged within the stationary portion of the machine, a first annular chamber formed by said thrust plate and by one of said collars, passages provided in the stationary portion of the machine and led into the face space of said thrust plate, which passages are intended for supplying power medium into said annular chamber, a second chamber arranged at the other face of said thrust plate and at the other collar and communicating with said first annular chamber as well as with said second chamber, a reduced pressure space communicating with said first annular chamber and with said second chamber, gaps for communicating said first annular chamber with said reduced pressure space and with said second chamber, a gap for communicating said second chamber with said reduced pressure space, this gap being closer to the longitudinal axis of said thrust plate than said gaps for communicating said first annular chamber with said reduced pressure space and with said second chamber.